(12) United States Patent
Zen et al.

(10) Patent No.: US 7,988,108 B2
(45) Date of Patent: Aug. 2, 2011

(54) SUPPORT FOR VIDEO-PHOTOGRAPHIC EQUIPMENT

(75) Inventors: Andrea Zen, Bassano Del Grappa (IT); Daniele Vigolo, Nove (IT)

(73) Assignee: Gitzo S.A., Rungis (FR)

( * ) Notice: Subject to any disclaimer, the term of this patent is extended or adjusted under 35 U.S.C. 154(b) by 407 days.

(21) Appl. No.: 12/226,578

(22) PCT Filed: Apr. 26, 2007

(86) PCT No.: PCT/EP2007/054118
§ 371 (c)(1),
(2), (4) Date: Oct. 22, 2008

(87) PCT Pub. No.: WO2007/125082
PCT Pub. Date: Nov. 8, 2007

(65) Prior Publication Data
US 2010/0108832 A1    May 6, 2010

(30) Foreign Application Priority Data
Apr. 27, 2006  (IT) ............... PD2006A0161

(51) Int. Cl.
*F16M 11/02* (2006.01)
(52) U.S. Cl. .................. 248/177.1; 248/157
(58) Field of Classification Search .......... 248/177.1, 248/176.1, 187.1, 157
See application file for complete search history.

(56) References Cited

U.S. PATENT DOCUMENTS

| 3,870,264 | A | 3/1975 | Robinson | |
|---|---|---|---|---|
| 6,820,844 | B2 * | 11/2004 | Tiffen et al. | 248/168 |
| 2003/0234327 | A1 | 12/2003 | Nakatani | |
| 2006/0175484 | A1 * | 8/2006 | Wood et al. | 248/177.1 |

FOREIGN PATENT DOCUMENTS

| FR | 2623595 A1 | 5/1989 |
|---|---|---|
| WO | WO 2005/114037 A2 | 12/2005 |

OTHER PUBLICATIONS

International Search Report, Form PCT/ISA/210, 2 pages, for International Application No. PCT/EP2007/054118 completed on Aug. 23, 2007 and mailed Aug. 31, 2007.

* cited by examiner

*Primary Examiner* — Ramon O Ramirez
(74) *Attorney, Agent, or Firm* — James C. Eaves, Jr.; James M. Francis; Greenebaum Doll & McDonald PLLC

(57) ABSTRACT

A tripod support for video-photographic equipment comprises a crosspiece with a tube, a column with a shaft sliding inside the tube of the crosspiece, the column having a plate arranged to be fitted at one end of the shaft and an end plug arranged to be fitted at the axially opposite end of the shaft as well as removable fixing means between the plate and shaft and between the shaft and plug respectively to remove the plate and plug from the shaft and the shaft from the tube. The fixing means onto the plate and onto the plug are mutually connectable, as an alternative to being connected to the shaft, to directly fix the plate and the plug to the opposite ends of the tube of the crosspiece when removed from the shaft.

10 Claims, 3 Drawing Sheets

SUPPORT FOR VIDEO-PHOTOGRAPHIC EQUIPMENT

TECHNICAL FIELD

This invention relates to a support for video-photographic equipment.

BACKGROUND ART

In the photographic, television and cinematographic field, the use of supports such as tripods, stands or suchlike for the adjustable support of filming devices is widely known.

In this technical field, the said supports comprise a crosspiece to which are connected in a known way three or more telescopic legs and a column which can slide axially in a tube within the crosspiece. A plate is fitted to the top of the column in order to anchor the supported device. The mechanism that connects the legs to the crosspiece enables them to be locked at different opening angles while the axial sliding of the column inside the tube of the crosspiece enables convenient height adjustment of the equipment.

Against the greater convenience of use afforded by such height adjustment, the main drawback resulting from the above-described technical solution is the interference between the section of column protruding beneath the crosspiece and the resting surfaces of the support that prevent the video-photographic equipment from being positioned at a very low point, for example in order to take shots at levels close to the ground.

Various mechanisms are known that have been built to tackle this problem. Two of them are described in EP0751338 and WO2005114037 respectively. In both of these documents, the sliding column comprises an upper part, connected to the plate, and a lower part that can be removed if low shots are to be taken.

As regards the structure of the supports defined in the said two solutions, the possibility of reducing the minimum height of the support itself is, however, limited by the fact that part of the column is replaced by a shorter part, but the column is not completely eliminated. These supports too are therefore unsuitable for extremely low set-ups.

DISCLOSURE OF THE INVENTION

The problem that lies at the heart of the present invention is to provide a support for video-photographic equipment comprising a column that can be dismantled and is structurally and operationally designed to overcome the above-mentioned limits connected with the said known art.

This problem and others which will emerge more clearly below are tackled and resolved by the invention by means of a support according to the claims below.

BRIEF DESCRIPTION OF THE DRAWINGS

Further features and advantages of the invention will emerge from the following detailed description of a preferred but not exclusive embodiment which is shown by way of a non-limiting example in the accompanying drawings, in which.

BEST MODE FOR CARRYING OUT THE INVENTION

Figure 1:
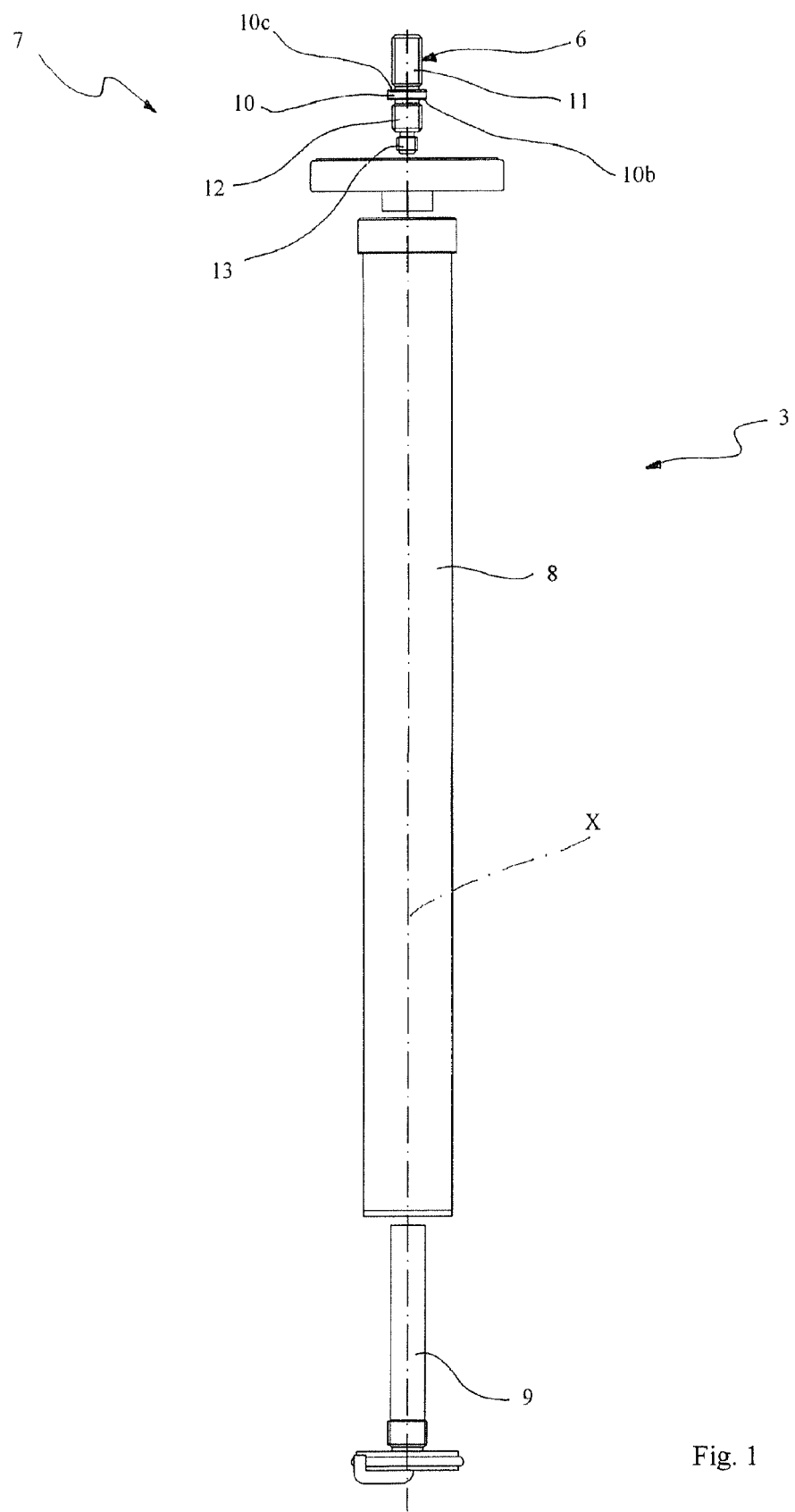
FIG. 1 is an exploded side view of a column and a device for anchoring the equipment to the support, according to this invention.

In the above-mentioned figures, 1 indicates a support of the tripod type with a crosspiece 2, having a tube 2b, into which is inserted a column 3, sliding in an axial direction and with the possibility of adjustable locking. A ring nut 4 to lock the column 3 is screwed to the top of the tube 2b to lock, by tightening it in a known way, the column 3 in relation to the crosspiece 2.

In the crosspiece 2, three or more legs 5 which are telescopically adjustable in length, in a known way, converge and are articulated.

The column 3 extends longitudinally along axis X and comprises an anchoring plate 7 for the said equipment, a tubular shaft 8 and an end plug 9.

The plate 7 in turn comprises an anchoring screw 6, with an almost cylindrical shape and coaxial with axis X. The screw has a cylindrical flange 10, in a median position, and two threaded portions 11 and 12, of the same diameter, longitudinally opposed. The cylindrical flange 10, larger in diameter than portions 11 and 12, defines two annular shoulders 10b, c, longitudinally opposed. At the end of portion 12, on the part longitudinally opposite flange 10, is a third threaded cylindrical portion 13, smaller in diameter than portions 11 and 12, of a longitudinal extension such that the longitudinal extension of portion 11 is the same as that of the assembly made up of portions 12 and 13.

The anchoring plate 7 has a circular surface 14 to support the video-photographic equipment and a cylindrical central cavity 15, coaxial with axis X, open at both of its opposing longitudinal ends and extending to a hub 16 protruding from the part opposite surface 14. Inside the hub 16 a shoulder 17 is defined, against which the shoulder 10b of the screw abuts, when the plate is tightened on the shaft 8.

Figure 2:
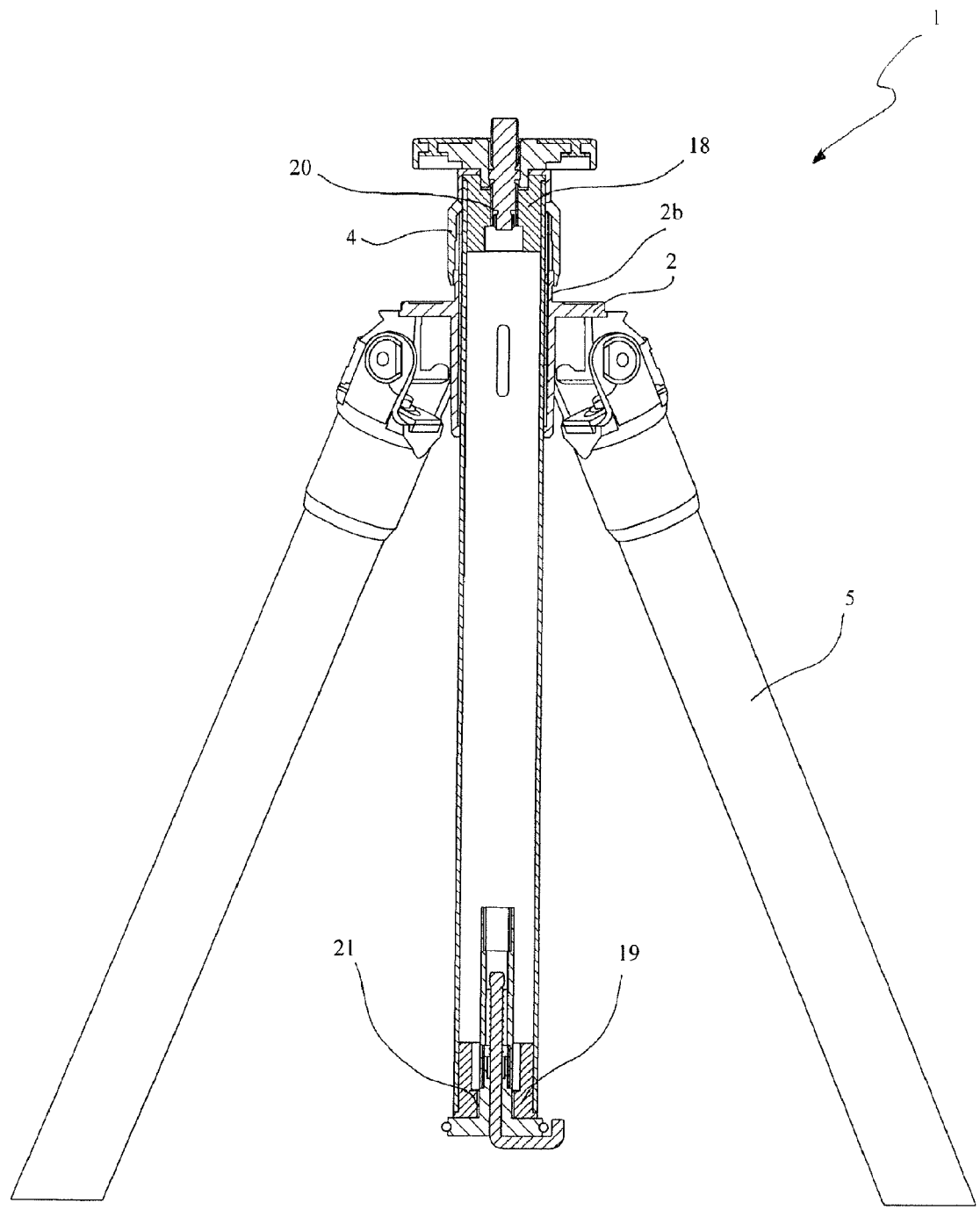
FIG. 2 is a longitudinal section of the support in the configuration with a column that slides inside the crosspiece.
Figure 3:
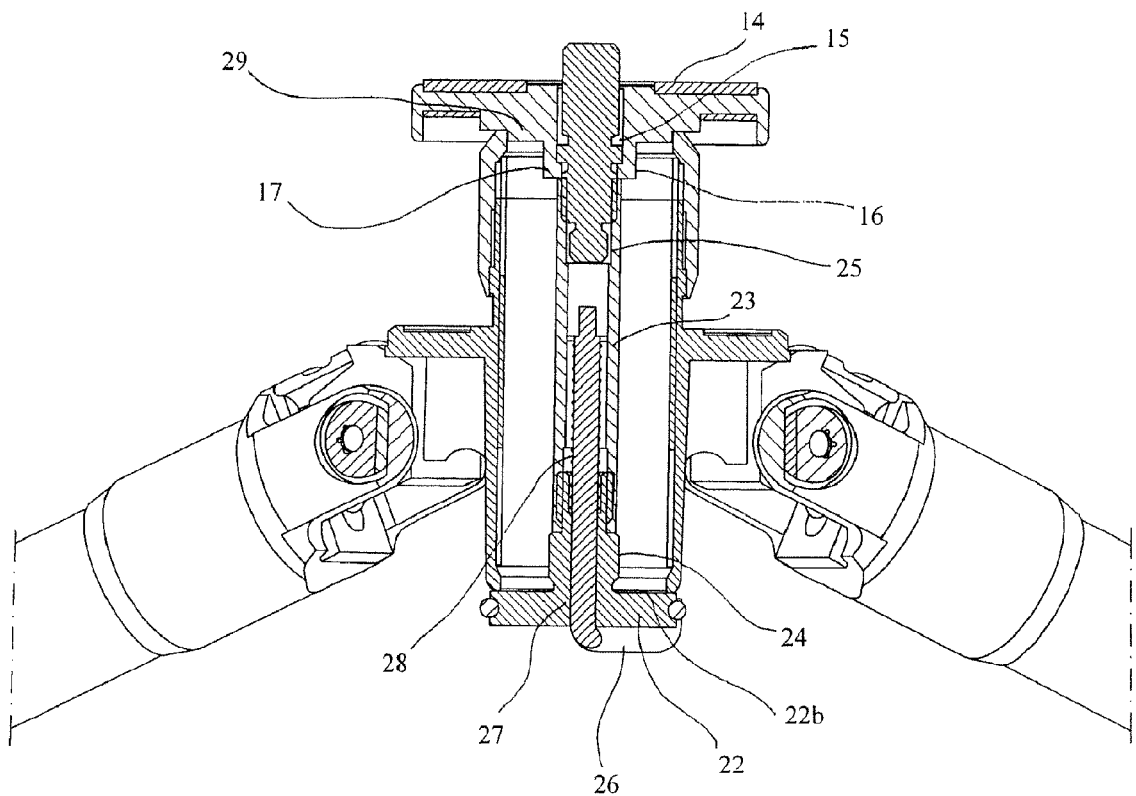
FIG. 3 is a longitudinal section of the support in the configuration without the column that slides inside the crosspiece.

In this condition the threaded portion 11 protrudes beyond the anchoring surface 14, as shown in FIGS. 1, 2 and 3. Alternatively, by removing and inverting the anchoring screw 6 through 180°, and subsequently engaging the threaded surface of portion 11 with threaded cylindrical seat 25, the shoulder 10c abuts against the shoulder 17 of the hub 16 and the threaded surface 13 protrudes beyond the anchoring surface 14 to form attachment devices for the chosen equipment.

The two different possibilities of housing the screw 6 inside the cavity 15 of the plate 7 enable equipment with threaded anchoring holes of various types to be anchored to the support 1.

At its opposing axial ends, the shaft 8 has a bush insert 18 and 19, which have threaded holes 20 and 21 respectively, which can be connected, respectively, to the anchoring screw 6 and end plug 9.

The plug 9 comprises a flange 22 defining a shoulder 22b from which a cylindrical portion 23, coaxial with axis X and internally hollow, rises perpendicularly. The portion 23 has a threaded external cylindrical surface 24, located at the longitudinal end adjacent to the flange 22 and connectable to the threaded hole 21, and a threaded cylindrical seat 25.

The threaded cylindrical seat 25 is located at the longitudinal end opposite the flange 22 and can be connected alternately to portion 11 or portion 12 of the anchoring screw 6, when the shaft 8 is removed from the column as will become clearer below. The end plug 9 comprises a hook for a counterweight 26 that slides inside a seat 27, coaxial with axis X, opposing a spring 28.

With reference to FIG. 2, the shaft 8 is connected in a sliding manner to the tube 2b of the crosspiece 2 so that the end having the insert 18 is at the opposite end to the legs 5; the anchoring plate 7 is resting on this end and locked axially and rotatably by means of the threaded connection between portion 11 and the hole 20 or, alternatively, between portion 12 and the hole 20. The end plug 9 is fixed to the longitudinally opposite end of the shaft 8 by the connection between the threaded surface 24 and the threaded hole 21.

The radial dimensions of the shoulder 22b are such as to interfere with the crosspiece 2 when the plug 9 is connected to the shaft 8, making it impossible for the column 3 to slip out when the latter is raised to maximum elevation in relation to the crosspiece 2.

As an alternative to the above-described connection and with reference to FIG. 3, the plate 7 and the plug 9 are fixed directly to the opposite ends of the tube 2b of the crosspiece 2. In order to centre and hold the plate on the tube in this position, centring means and counter-means are provided including a collar 29 in relief on the face of the plate opposite surface 14 and capable of insertion into the opening of the ring nut 4, with substantial shape fit.

The shoulder 22b of the plug 9 rests on the tube 2b, at the opposite end to the plate 7. The plug 9 and the anchoring screw 6, inserted in the cavity 15, are rigidly secured by the connection between the portion 12 and the threaded surface 25. Alternatively, by removing and vertically inverting the anchoring screw 6 through 180°, the plug 9 and anchoring screw 6 can be rigidly secured by the connection between portion 11 and the threaded surface 25. In the above-described assembly, compared to the configuration with the sliding column, the absence of the shaft 8 enables the maximum reduction of the height of the tripod's set-up position from the ground.

Furthermore, when the operator considers it unnecessary to make a fine adjustment of the elongation of the column, removing the shaft 8 allows him to reduce the overall weight of the tripod.

The present invention provides a support with a column that can be dismantled in which the shaft sliding inside the column can be removed and the plate can be secured directly to the crosspiece by removable connection to the end plug.

The present invention thus resolves the above-mentioned problems with regard to the said known art, offering the possibility of considerably reducing the minimum set-up height of the support for video-photographic equipment and, consequently, the shooting angle of such equipment.

The invention claimed is:

1. A tripod support for video-photographic equipment comprising a crosspiece with a tube, a column with a shaft sliding inside said tube of the crosspiece, the column having a plate arranged to be fitted at one end of the shaft and an end plug arranged to be fitted at the axially opposite end of said shaft as well as removable fixing means between the plate and shaft and between the shaft and plug respectively to remove the plate and plug from the shaft and the shaft from the tube, wherein the means of fixing onto the plate and onto the plug are mutually connectable, as an alternative to being connected to the shaft, to directly fix the plate and the plug to the opposite ends of said tube of the crosspiece when removed from the shaft.

2. The tripod support according to claim 1, wherein the fixing means between the shaft and plug comprise, on the plug, a portion having a first threaded connection element to connect with a corresponding element of the shaft and a second threaded connection element to connect with a corresponding element of the plate.

3. The tripod support according to claim 2, wherein the second connection element is a threaded seat made on the portion at the opposite end to a plug abutment shoulder.

4. The tripod support according to claim 3, wherein the portion at the opposite end to said plug abutment shoulder constitutes a fixing seat for a hook means for counterweights.

5. The tripod support according to claim 3, wherein the portion constitutes a fixing seat for a hook means for counterweights.

6. The tripod support according to claim 1, wherein the fixing means between the plate and shaft comprise a connection element that can be alternatively engaged with a corresponding element of the shaft or with a threaded connection element of said plug.

7. The tripod support according to claim 6, wherein the connection element is a screw held axially on the plate.

8. The tripod support according to claim 7, wherein said screw is held in a removable and reversible manner on the plate to present to the connection surface of the plate threaded ends of different diameters.

9. The tripod support according to claim 1, wherein the shaft has connection elements that are bush inserts engaged axially in a respective threaded hole, wherein one and respectively the other of a first threaded connection element and another connection element is accommodated.

10. The tripod support according to claim 1, wherein centring means and counter-means are defined on a plate and tube to securely lock said plate in relation to said tube.

* * * * *